US008386073B2

(12) United States Patent
Kim

(10) Patent No.: US 8,386,073 B2
(45) Date of Patent: Feb. 26, 2013

(54) MODULE FOR REGULATING QUANTITY OF VARIOUS-SHAPED TABLETS IN AUTOMATIC TABLET DISPENSER, AND TABLET DISPENSING METHOD THEREOF

(75) Inventor: Ho-yeon Kim, Anyang-si (KR)

(73) Assignee: Cretem Co., Ltd., Anyang-si (KR)

( * ) Notice: Subject to any disclaimer, the term of this patent is extended or adjusted under 35 U.S.C. 154(b) by 477 days.

(21) Appl. No.: 12/673,033

(22) PCT Filed: Sep. 19, 2008

(86) PCT No.: PCT/KR2008/005549

§ 371 (c)(1),
(2), (4) Date: Feb. 11, 2010

(87) PCT Pub. No.: WO2009/038380

PCT Pub. Date: Mar. 26, 2009

(65) Prior Publication Data

US 2011/0313566 A1 Dec. 22, 2011

(30) Foreign Application Priority Data

| | | |
|---|---|---|
| Sep. 21, 2007 | (KR) | 10-2007-0096847 |
| Oct. 30, 2007 | (KR) | 10-2007-0109844 |
| Apr. 29, 2008 | (KR) | 10-2008-0039998 |

(51) Int. Cl.
*G06F 17/00* (2006.01)

(52) U.S. Cl. ........ 700/236; 700/242; 221/167; 221/178; 221/180

(58) Field of Classification Search .................... 221/68, 221/211, 167, 178, 180, 181, 182, 311; 700/236, 700/240, 242, 243; 209/551, 652, 908
See application file for complete search history.

(56) References Cited

U.S. PATENT DOCUMENTS 3,677,437 A 7/1972 Haigler
(Continued)

FOREIGN PATENT DOCUMENTS

EP 1728718 A1 12/2006
JP 2004-115128 4/2004
(Continued)

OTHER PUBLICATIONS

European Search Report issued on Jun. 14, 2012 in counterpart European Patent Application No. 08832480.1 (4 pages, in English).

*Primary Examiner* — Timothy Waggoner
(74) *Attorney, Agent, or Firm* — NSIP Law

(57) ABSTRACT

Disclosed are a quantity regulating module of an automatic tablet dispenser, and a tablet dispensing method thereof, which are capable of automatically packing various-shaped tablets, and accurately, rapidly and cleanly controlling supplying of tablets without missing any. The quantity regulating module includes: a module body including an inlet through which a tablet is put, a hopper-side supply part supplying the tablet put through the inlet to a hopper of a medicine packing machine, and a recollecting part returning the tablet put through the inlet to a location from which the tablet starts to be transferred; a detecting sensor counting the number of tablets put through the inlet; and a controller comparing the number of tablets counted by the detecting sensor to a predetermined quantity, transferring the tablets to the hopper-side supply part if the counted number of tablets is equal to the predetermined quantity, and transferring the tablets to the recollecting part if the counted number of tablets exceeds the predetermined quantity.

13 Claims, 11 Drawing Sheets

U.S. PATENT DOCUMENTS

| | | | | |
|---|---|---|---|---|
| 4,559,981 | A * | 12/1985 | Hirano | 141/83 |
| 5,348,061 | A * | 9/1994 | Riley et al. | 221/129 |
| 5,638,417 | A | 6/1997 | Boyer et al. | |
| 5,638,657 | A | 6/1997 | Archer et al. | |
| 5,774,518 | A | 6/1998 | Kirby | |
| 6,237,804 | B1 | 5/2001 | Peery et al. | |
| 6,684,914 | B2 * | 2/2004 | Gershman et al. | 221/129 |
| 6,792,736 | B1 * | 9/2004 | Takahashi et al. | 53/237 |
| 6,799,684 | B2 * | 10/2004 | Wooldridge | 209/551 |
| 2002/0134790 | A1 | 9/2002 | Tamaoki | |
| 2006/0237093 | A1 | 10/2006 | Geltser et al. | |

FOREIGN PATENT DOCUMENTS

| | | |
|---|---|---|
| KR | 1019940001688 | 9/1997 |
| KR | 10-2004-0052034 | 6/2004 |
| KR | 10-0582760 | 5/2006 |
| KR | 1020050046869 | 6/2006 |
| KR | 1020070047707 | 3/2008 |
| KR | 10-2009-0031169 | 3/2009 |

* cited by examiner

MODULE FOR REGULATING QUANTITY OF VARIOUS-SHAPED TABLETS IN AUTOMATIC TABLET DISPENSER, AND TABLET DISPENSING METHOD THEREOF

TECHNICAL FIELD

The following description relates to a module for adjusting the quantity of various-shaped tablets in an automatic tablet dispenser which is installed in a medicine packing machine, and a tablet dispensing method thereof, and more particularly, to a module for adjusting the quantity of various-shaped tablets in an automatic tablet dispenser and a tablet dispensing method thereof, which can accurately and rapidly control supplying of tablets without missing any.

BACKGROUND ART

In general, a medicine packing machine is used to automatically pack tablets when a doctor or pharmacist prepares a medicine based on a prescription at hospital or drugstore.

Conventional medicine packing machines can be classified into manual packing machines and automatic packing machines. The manual packing machine and the automatic packing machine are different in view of distributing tablets manually or automatically, but the same in view of automatically packing tablets and discharging medicine packages to the outside.

That is, the manual packing machine includes a circular or quadrilateral distribution tray with a plurality of holes. A doctor or pharmacist puts tablets into the holes manually, generally, puts tablets corresponding to a dose of medicine into each hole. The tablets put into the holes are packed by a packing unit provided in the lower portion of the manual packing machine, and then discharged to the outside.

Also, the automatic packing machine includes a plurality of cassettes which are arranged in the form of a plurality of drawers or in the form of a plurality of drums, in the upper portion. Tablets are classified depending on their kinds and stored in the cassettes. The tablets stored in the cassettes are discharged from the cassettes based on data received from a computer interfacing the automatic packing machine. The discharged tablets are collected in a hopper provided below the cassettes, and packed in the packing unit provided below the hopper.

The manual packing machine can be manufactured as a small-sized machine, and suitable to be used at a small drugstore or hospital, and the automatic packing machine is suitable to be used at a large drugstore or hospital where a large amount of medicines is prepared. Also, a combination of a manual packing machine and automatic packing machine is being used at some drugstores or hospitals.

However, cassettes installed in a conventional automatic packing machine cannot automatically discharge pieces of tablets such as half tablets or various-shaped tablets. Accordingly, pieces of tablets or various-shaped tablets should be supplied manually using a manual packing machine. Accordingly, the conventional medicine packing machine has a problem that a time consumed to prepare a medicine is long and reliability of medication is low due to mistakes, such as overdosage or under-dosage of medication.

Meanwhile, since in the conventional medicine packing machine a doctor or pharmacist picks up and distributes tablets with his or her hand, there is a risk of bacterial infection due to the direct contact of the hand or other mediums. If tablets infected with even a bit of bacteria due to the direct contact of a human's hand, etc. are absorbed in the body, this may cause fatal diseases to serious cases with low immunity.

DISCLOSURE OF INVENTION

Technical Solution

According to an aspect, there is provided a quantity regulating module of an automatic tablet dispenser, and a tablet dispensing method thereof, which are capable of automatically packing various-shaped tablets, and accurately, rapidly and cleanly controlling supplying of tablets without missing any.

Advantageous Effects

Therefore, according to the quantity regulating module of the automatic tablet dispenser and the tablet dispensing method thereof, it is possible to automatically pack various-shaped tablets, and accurately, rapidly and cleanly control supplying of tablets without missing any.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

MODE FOR THE INVENTION

Figure 1:
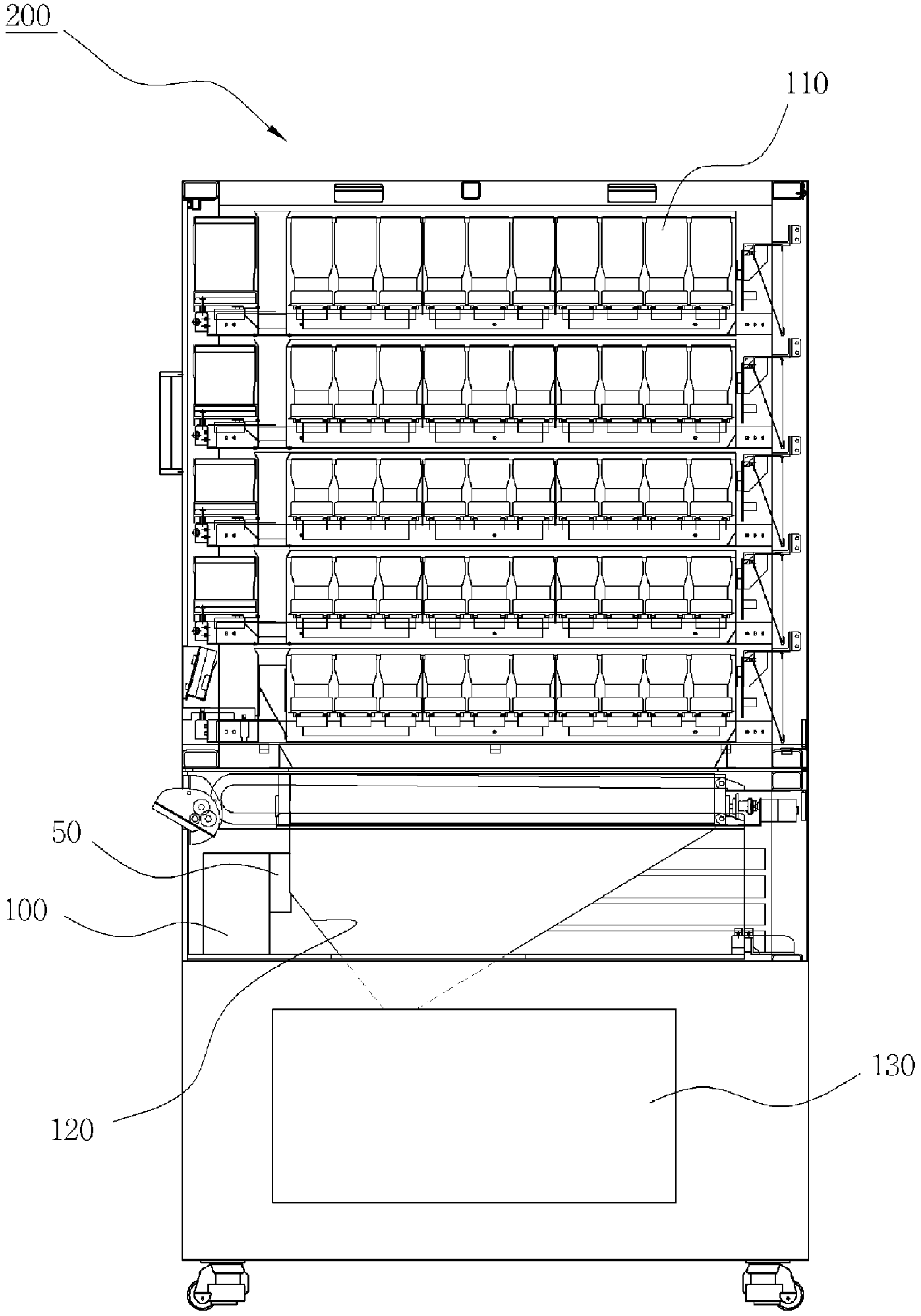
FIG. 1 is a construction view of a medicine packing machine according to an embodiment.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numbers in the drawings denote like elements.

FIG. 1 is a construction view of a medicine packing machine 200 according to an embodiment.

Referring to FIG. 1, the medicine packing machine 200 includes a plurality of cassettes 110 storing tablets therein and arranged in tiers, a hopper 120 collecting tablets therein and provided below the cassettes 110, an automatic tablet dispenser 100 supplying tablets to the hopper 120, and a packing unit 130 disposed below the hopper 120 to pack tablets collected therein and discharge them to the outside.

The automatic tablet dispenser 100 supplies tablets by a predetermined number to the hopper 120, and the tablets are packed together with tablets supplied from the cassettes 110 in the packing unit 130. The automatic tablet dispenser 100 can supply tablets to the hopper 120 in various ways. For example, the automatic tablet dispenser 100 supplies tablets to the hopper 120 through a conveyer, or using one of other various ways.

According to an embodiment, the automatic tablet dispenser 100 transfers tablets by vibration. That is, the automatic tablet dispenser 100 causes tablets to move in a line along a track by vibration after pouring the tablets into a predetermined space.

A quantity regulating module 50, which is installed in the automatic tablet dispenser 100, supplies the tablets transferred in a line along the track one by one or by a predetermined number to the hopper 120.

Figure 2:
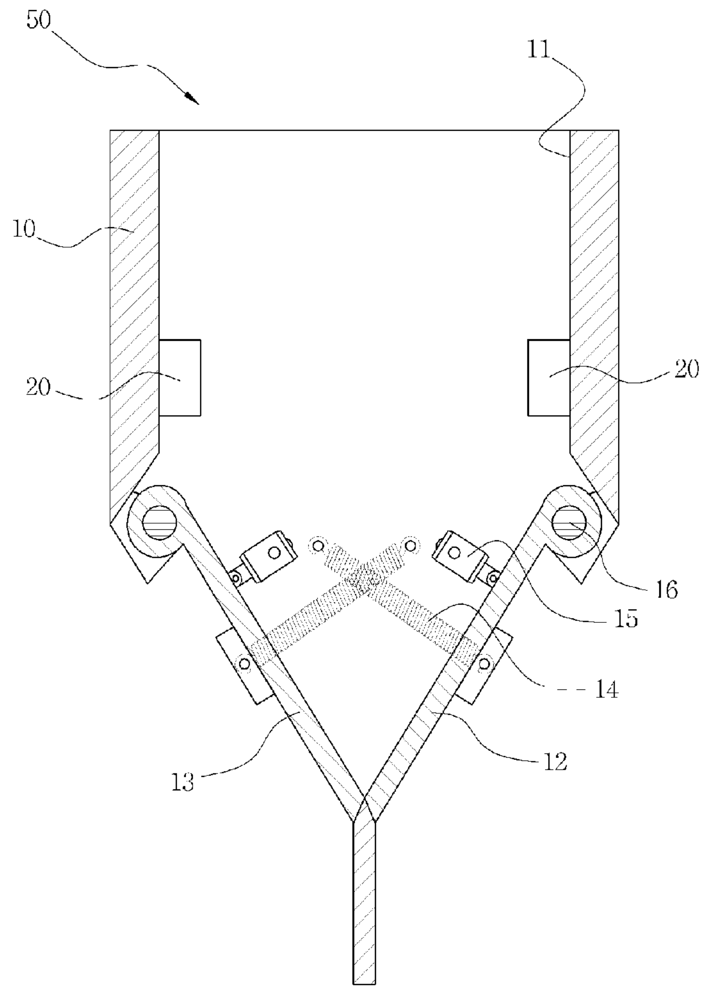
FIG. 2 is a cross-sectional view of a quantity regulating module according to an embodiment.

FIG. 2 is a cross-sectional view of the quantity regulating module 50 according to an embodiment.

Referring to FIG. 2, the quantity regulating module 50 includes a module body 10, a detecting sensor 20, and a controller.

The module body 10 includes an inlet 11, a hopper-side supply part 12, and a recollecting part 13. The inlet 11 is a passage through which tablets transferred along a track, etc. are put, and is seen by opening the upper part of the module body 10. The hopper-side supply part 12 transfers tablets put through the inlet 11 to the hopper 120 of the medicine packing machine 200 (see FIG. 1). The recollecting part 13 returns the tablets put through the inlet 11 to a location from which the tablets start to be transferred. Here, the transfer start location may be a predetermined space from which the tablets start to be transferred.

The hopper-side supply part 12 and the recollecting part 13 each is assembled in such a manner as to rotate by a hinge 16 connected to its one end. The hopper-side supply part 12 and the recollecting part 13 each discharges tablets contained in the module body 10 to the outside, or prevents the tablets from being discharged to the outside. Accordingly, two different paths may be provided in which tablets discharged from the hopper-side supply part 12 are supplied to the hopper 120, and tablets discharged from the recollecting part 13 are recollected and redistributed or discharged out of the medicine packing machine. A partition may be provided between the hopper-side supply part 12 and the recollecting part 13.

Also, a solenoid valve 15 is connected to each of the hopper-side supply part 12 and the recollecting part 13 so that the hopper-side supply part 12 and the recollecting part 13 are rotatively driven to be opened or closed. Also, a spring 14 is connected to each of the hopper-side supply part 12 and recollecting part 13, so that the hopper-side supply part 12 and the recollecting part 13 are closed automatically by restoring force of the spring 14, not by separate driving force.

The detecting sensor 20 is disposed at a proper location in the module body 10, and counts the number of tablets put through the inlet 11.

The controller compares the number of tablets counted by the detecting sensor to a predetermined quantity, and opens the hopper-side supply part 12 if the counted value is equal to the predetermined quantity, and opens the recollecting part 13 if the counted value exceeds the predetermined quantity.

That is, the controller interfaces the detecting sensor 20, and compares the number of tablets counted by the detecting sensor 20 to a predetermined quantity set by key manipulation, etc. Then, if the counted value is equal to the predetermined quantity, the tablets are discharged to the hopper 120 and packed in a packing unit 130. However, if the counted value exceeds the predetermined quantity, the tablets are fed back to a location from which the tablets start to be transferred.

Figure 3:
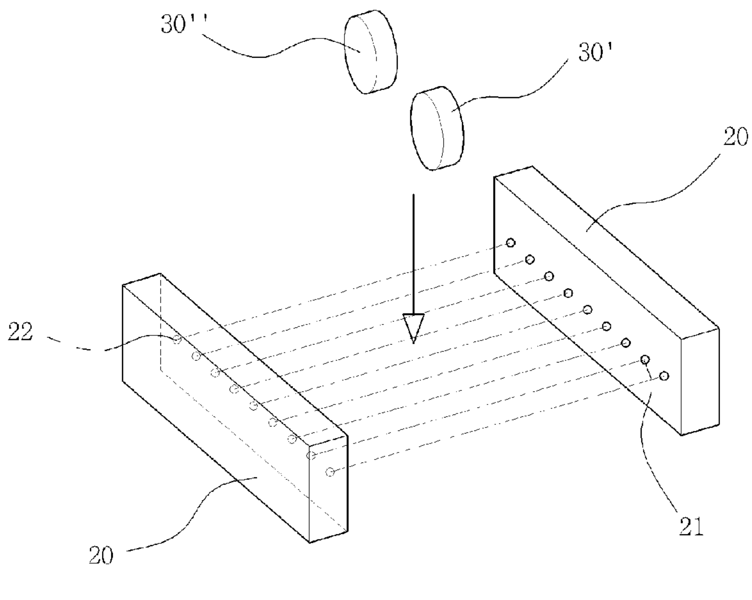
FIG. 3 is a perspective view of a detecting sensor according to an embodiment.

FIG. 3 is a perspective view of the detecting sensor 20 according to an embodiment.

As illustrated in FIG. 3, the detecting sensor 20 can include at least one light-emitting part 21 for emitting light, and at least one light-receiving part 22 for receiving light emitted from the light-emitting part 21 and sensing the presence of a tablet. The detecting sensor 20 counts the number of objects (that is, the number of tablets) passing between the light-emitting part 21 and light-receiving part 22 by receiving light emitted from the light-emitting part.

That is, when no tablet passes through the detecting sensor 20, light emitted from the light-emitting part 21 is all received by the light-receiving part 22, so that an "On" signal is generated, and when a tablet passes through the detecting sensor 20, light emitted from the light-emitting part 21 is intercepted by the tablet and accordingly the light-receiving part 22 does not receive the light, so that an "Off" signal is generated. In this manner, the detecting sensor 20 counts the number of tablets passing through the light-emitting part 21 and light-receiving part 22 on the basis of the "On" and "Off" signals.

Basically, when the number of tablets fallen down through the inlet 11 reaches one or a desired number, the automatic tablet dispenser 100 stops vibration temporarily and prevents the following tablet from being fallen down. However, the case where the following tablet falls down due to inertial force of tablets moving along the track may occur. When such an unwanted successive dropping of two tablets occurs, by accurately detecting "On" and "Off" signals with a time difference between times at which the two tablets fall down, the detecting sensor 20 can accurately detect the number of tablets put into the module body 10 without any error.

Also, when half tablets or tablet pieces are supplied, two tablets positioned very closely to each other can be recognized as a single tablet. However, in this case, since the tablets fall down while being separated apart by free-falling, the detecting sensor 20 senses whether light passes though a gap between the two tablets separated apart, thus accurately counting the number of tablets.

The light-emitting part 21 may be positioned in correspondence to the light-receiving part 22. Accordingly, it is possible to more accurately count the number of tablets passing between the light-emitting part 21 and light-receiving part 22, and reduce possible errors of recognizing two tablets as a single object. That is, a pair of detecting sensors include a plurality of light-emitting parts 21 and a plurality of light-receiving parts 22, which are densely arranged, in such a manner that the light-emitting parts 21 can be positioned in correspondence to the light-receiving parts 22. Accordingly, a tablet passing between the pair of detecting sensors can be detected over a wide range.

Figure 4:
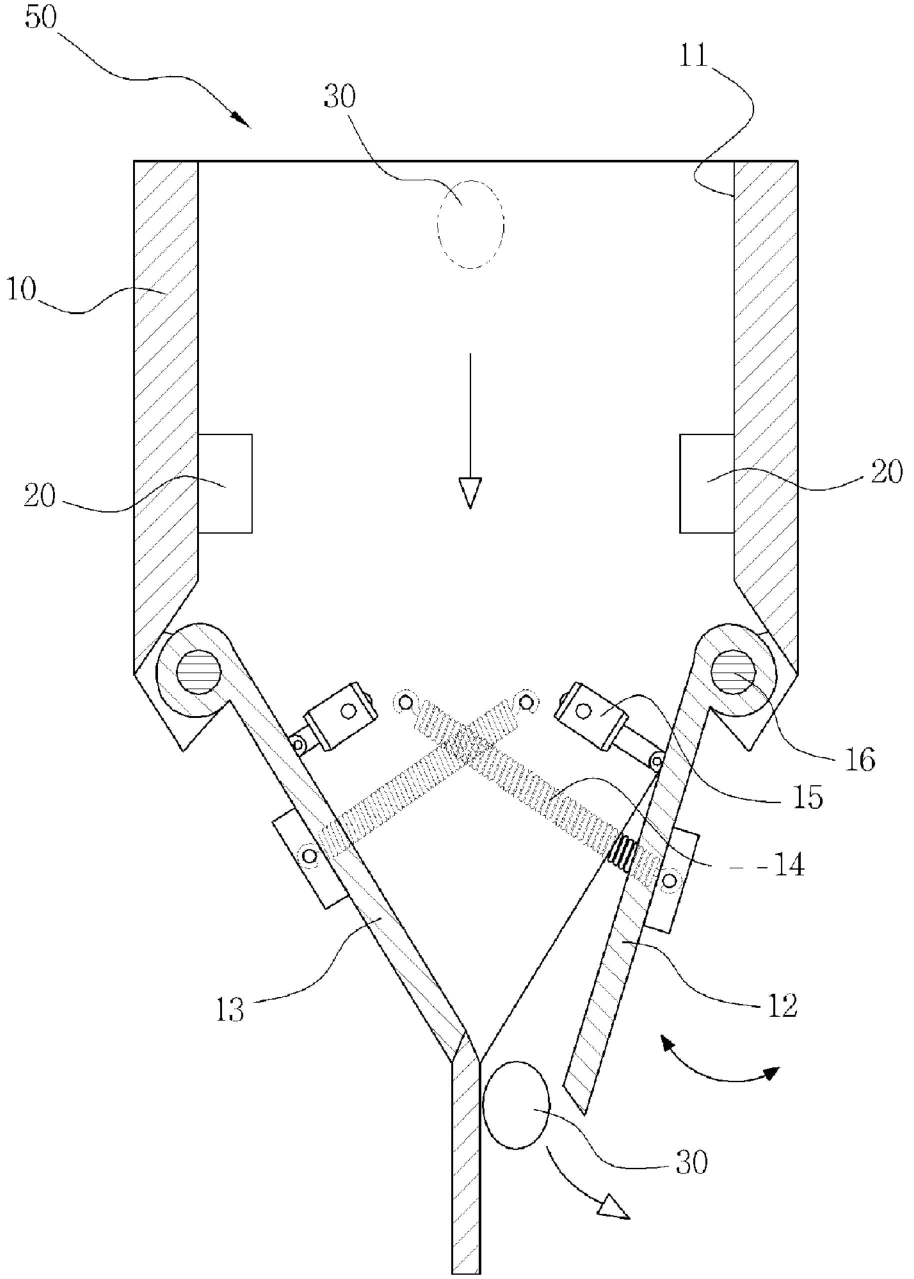
FIGS. 4 and 5 are views for explaining operation of the quantity regulating module illustrated in FIG. 2, according to an embodiment.
Figure 5:
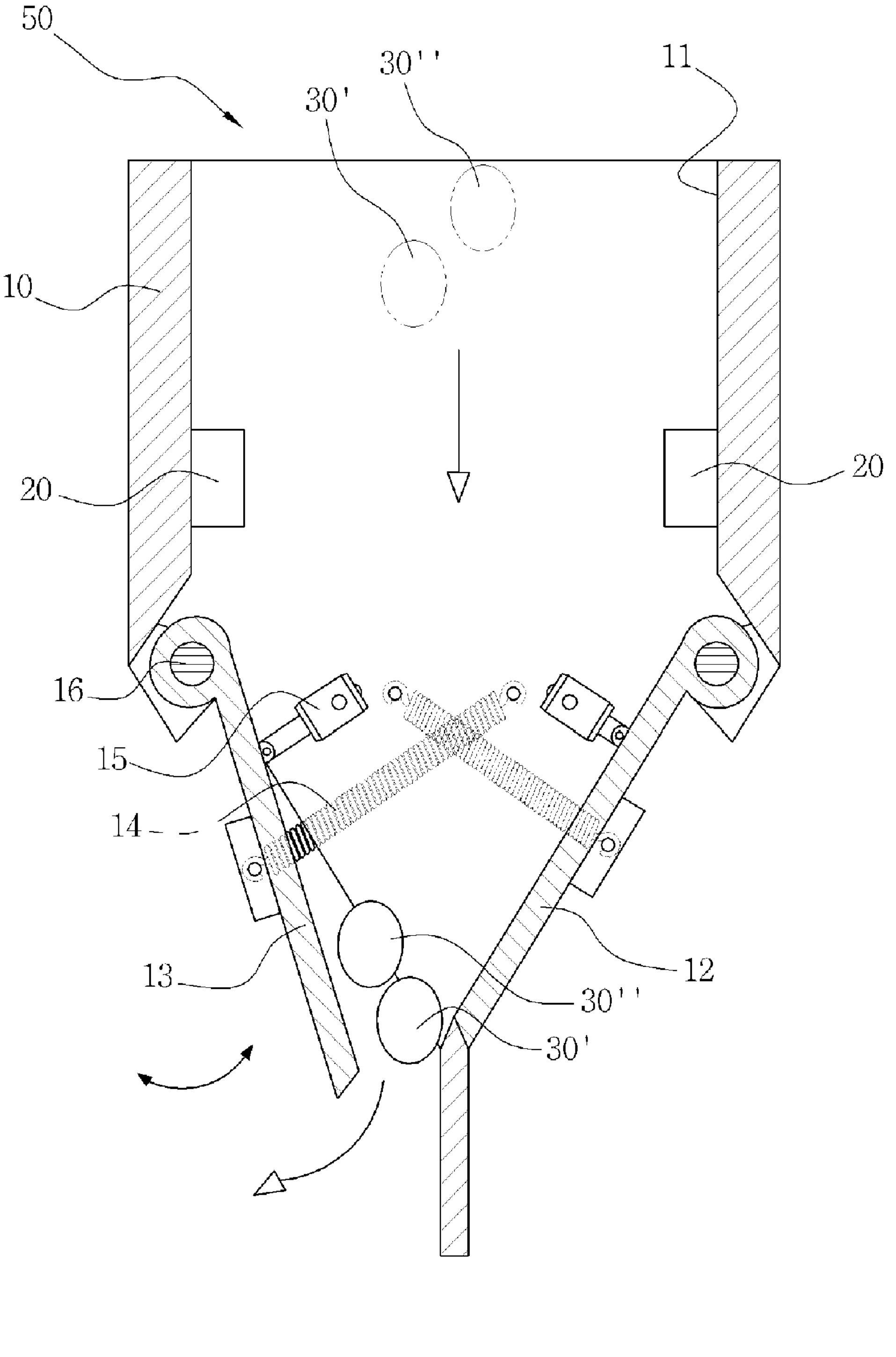

FIGS. 4 and 5 are views for explaining the operation of the quantity regulating module 50 according to an embodiment. Here, it is assumed that the predetermined quantity is one tablet.

Referring to FIG. 4, if a single tablet 30 is sensed by the detecting sensor 20, the controller opens the hopper-side supply part 12 so that the tablet 30 is transferred to the hopper 120. The tablet 30 is collected in the hopper 120 together with tablets discharged from the cassettes 110 of the medicine packing machine 200, and all the tablets are packed in the packing unit 130.

Also, as illustrated in FIG. 5, it is assumed that the number of tablets 30' and 30" that are to be counted by the detecting sensor 20 is 2. That is, when another tablet 30" unwantedly falls down, or when two tablets 30' and 30" fall down simultaneously, the controller opens the recollecting part 13 so that the tablets 30' and 30" can be redistributed later. The tablets 30' and 30" discharged from the recollecting part 13 move along a passage to a location from which the tablets 30' and 30" start to be transferred so that the tablets 30' and 30" can be redistributed.

Figure 6:
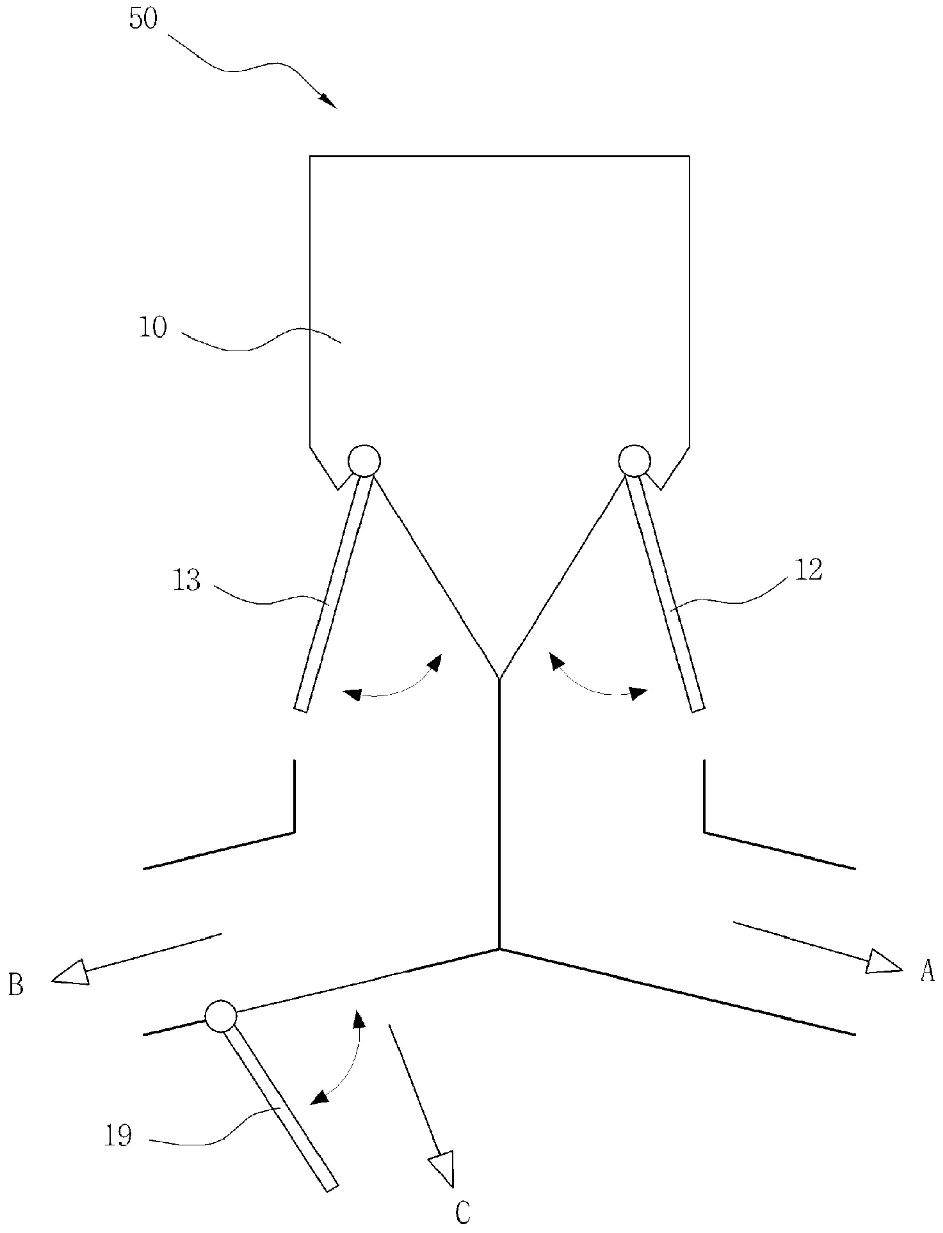
FIG. 6 is a construction view of a quantity regulating module according to another embodiment.

FIG. 6 is a construction view of a quantity regulating module 50 according to another embodiment. As illustrated in FIG. 6, a module body 10 can further include a discharge part 19 for discharging tablets transferred to the recollecting part 13 to the outside. If the number of tablets put into the module body 10 reaches a predetermined quantity, a hopper-side supply part 12 is opened and accordingly the tablets move to a hopper (in the direction A). Meanwhile, if the number of tablets put into the module body 10 exceeds the predetermined quantity, the recollecting part 13 is opened and accordingly the tablets are recollected to a location from which the tablets start to be transferred, or the tablets are discharged to the outside (in the direction C).

Meanwhile, the module body 10 can further include a stopper. The stopper drops a tablet rapidly into the inlet 11 or prevents the following tablet from being dropped down unwantedly, when the detecting sensor 20 senses the presence of the tablet.

Figure 7:
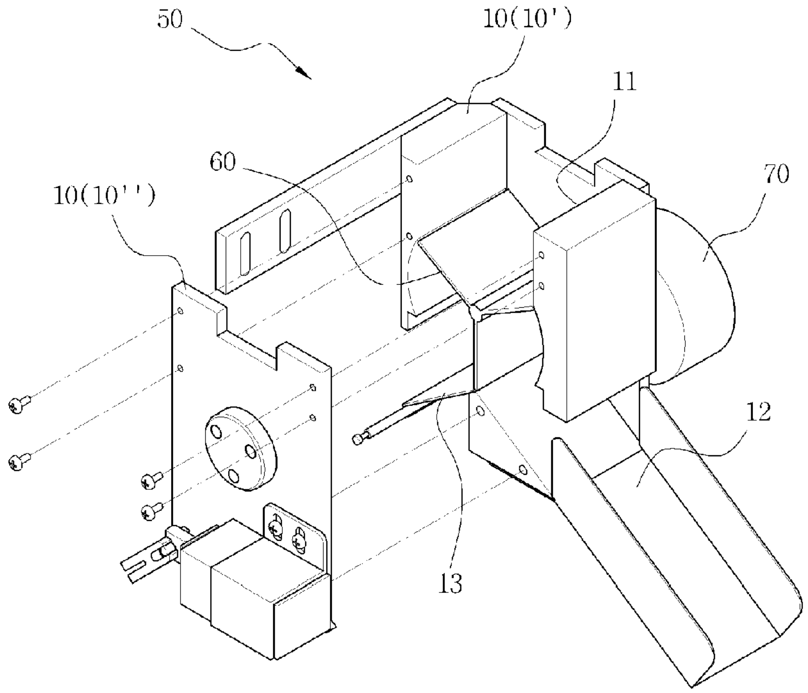
FIG. 7 is an exploded perspective view of a quantity regulating module according to still another embodiment.
Figure 8:
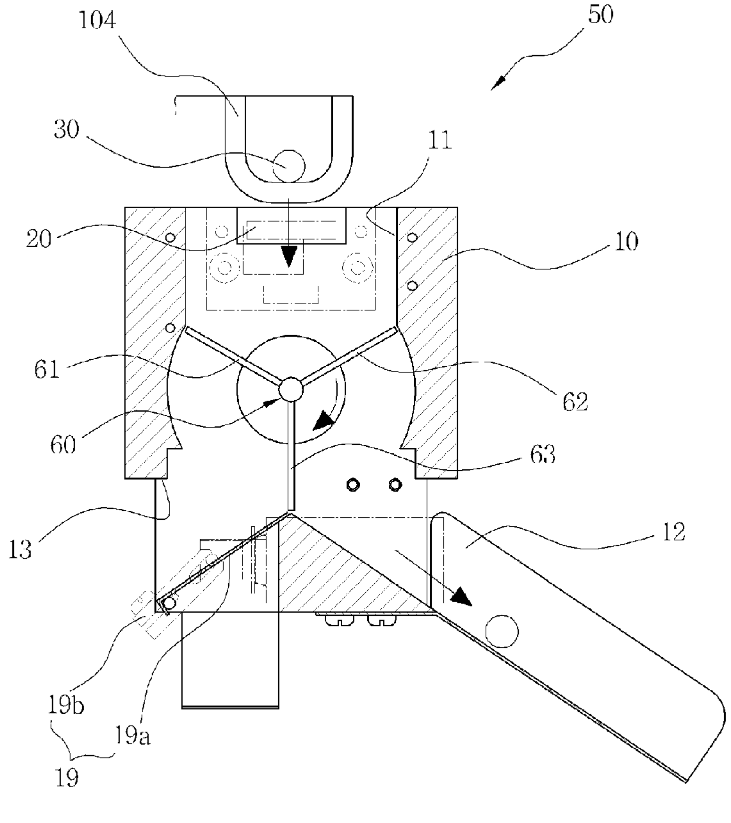
FIGS. 8, 9 and 10 are views for explaining operation of the quantity regulating module illustrated in FIG. 7.
Figure 9:
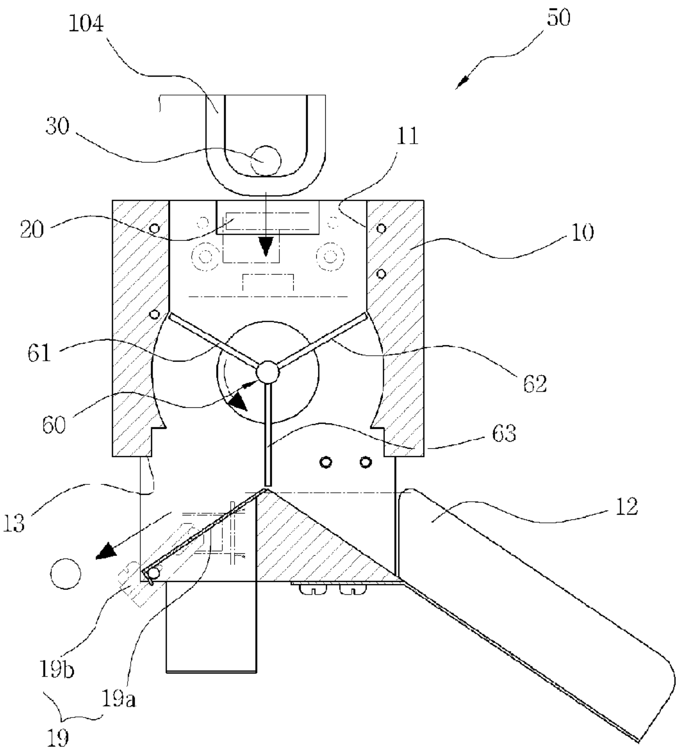
Figure 10:
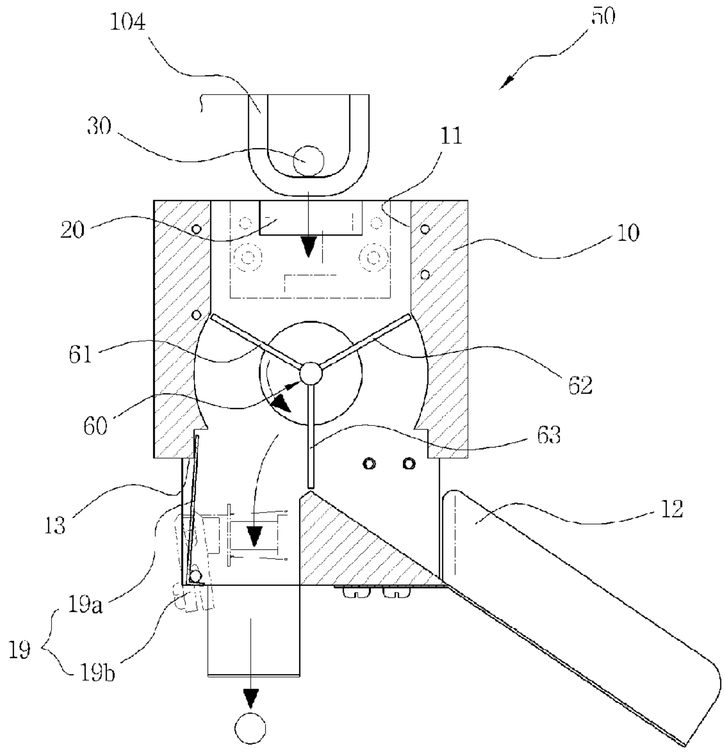

FIG. 7 is an exploded perspective view of a quantity regulating module 50 according to still another embodiment, and FIGS. 8, 9 and 10 are views for explaining the operation of the quantity regulating module 50 illustrated in FIG. 7.

As illustrated in FIGS. 7 and 10, the quantity regulating module 50 is disposed below a track outlet 104 of an automatic tablet dispenser 100 (see FIG. 1). The track outlet 104 is an outlet through which tablets transferred along a track are discharged, and tablets falling down from the track outlet 104 are dropped down in the inlet 11 of the quantity regulating module 50.

The quantity regulating module 50 includes a rotating member 60 and a motor 70.

The rotating member 60, which is disposed below the inlet 11, includes a plurality of wings 61, 62 and 63 positioned in the radial direction and receives tablets 30 falling down through the inlet 11. The rotating member 60 discharges a tablet 30 selectively to the hopper-side supply part 12 or to the recollecting part 13 according to the rotation direction.

The motor 70 receives a signal from the controller, and rotates the rotating member 60 forward or backward, that is, in the clockwise direction or in the counterclockwise direction.

The rotating member 60 is connected to the motor 70, and rotated in the clockwise direction or in the counterclockwise direction in the module body 10. The rotating member 60 includes the plurality of wings 61, 62 and 63 positioned in the radial direction, for example, in the shape of a wind sail or water-wheel. For example, the motor 70 is installed on the rear of a back module body 10' the rotating member 60 is linked to the axis of the motor 70 and then a front module body 10" is coupled with the back module body 10, thereby completing an assembly. The hopper-side supply part 12 and the recollecting part 13 are disposed below the rotating member 60, so that tablets fallen on the rotating member 60 are discharged to the hopper 120 or to the location from which the tablets start to be transferred.

In this case, the wings 61, 62 and 63 may be positioned at angles of 120°. As such, if the wings 61, 62 and 63 are positioned at the same angle of 120°, the wings 61, 62 and 63 can efficiently receive and discharge tablets. However, it will be understood by one of those skilled in the art that a plurality of wings can be positioned at predetermined angles, for example, at angles of 90°.

Meanwhile, the module body 10 can further include a discharge unit 19 for discharging tablets transferred to the recollecting part 13 to the outside. The discharge unit 19 includes a door **19*a* for discharging tablets to the outside and a solenoid 19*b* for driving the door 19*a***.

The operation of the quantity regulating module 50 will be described in detail with reference to FIGS. 8, 9 and 10, below.

FIG. 8 is a view for explaining the operation of discharging a tablet 30 to the hopper-side supply part 12 when the counted number of tablets is equal to a predetermined quantity after the tablet 30 fallen down from the track outlet 104 is counted by the detecting sensor 20. That is, the tablet 30 fallen down from the track outlet 104 is dropped between the first and second wings 61 and 62 of the rotating member 60 via the detecting sensor 20. Since the number of tablets counted by the detecting sensor 20 is equal to the predetermined quantity, the rotating member 60 is rotated by 120 in the clockwise direction, and accordingly a tablet staying between the first and second wings 61 and 62 is discharged to the hopper-side supply part 12.

FIG. 9 is a view for explaining the operation of recollecting a tablet 30 fallen from the track outlet 104 in the recollecting part 13 when the counted value exceeds the predetermined quantity after the tablet 30 is counted by the detecting sensor 20. That is, the tablet 30 fallen down from the track outlet 104 is dropped between the first and second wings 61 and 62 of the rotating member 20 via the detecting sensor 20, at this time, since the number of tablets 30 counted by the detecting sensor 20 exceeds the predetermined quantity, the rotating member is rotated by 120° in the counterclockwise direction and the tablet 30 staying between the first and second wings 61 and 62 is discharged to the recollecting part 13.

FIG. 10 is a view for explaining the operation of discharging all tablets fallen down from the track outlet 104 to the outside, when the counted value exceeds the predetermined quantity or by an external manipulation, after the tablet 30 is counted by the detecting sensor 20. That is, the tablet 30 fallen down from the track outlet 104 is dropped between the first and second wings 61 and 62 via the detecting sensor 20. In the case where the quantity regulating module 50 is set to a discharge mode, the rotating member 60 is rotated by 120° in the counterclockwise direction, and a door **19*a* connected to the solenoid 19*b* is opened, so that the tablet 30** is discharged to the outside.

As such, the tablet 30 is discharged to the hopper-side supply part 12 or to the recollecting part 13 in a rotating manner, and accordingly, smooth driving is possible and no noise is generated. Also, it is prevented a phenomenon where a tablet is adhered to the inner wall of the module body 10 when the tablet is discharged. Also, when the first, second and third wings 61, 62 and 63 of the rotating member 60 are rotated, a tablet dropped between the first and second wings 61 and 62 is discharged by a single rotation to the hopper-side supply part 12 or recollecting part 13, and simultaneously the third wind 63 is ready to receive the following tablet that is to fall via the inlet 11, so that the entire structure becomes stable and energy efficiency is enhanced.

Figure 11:
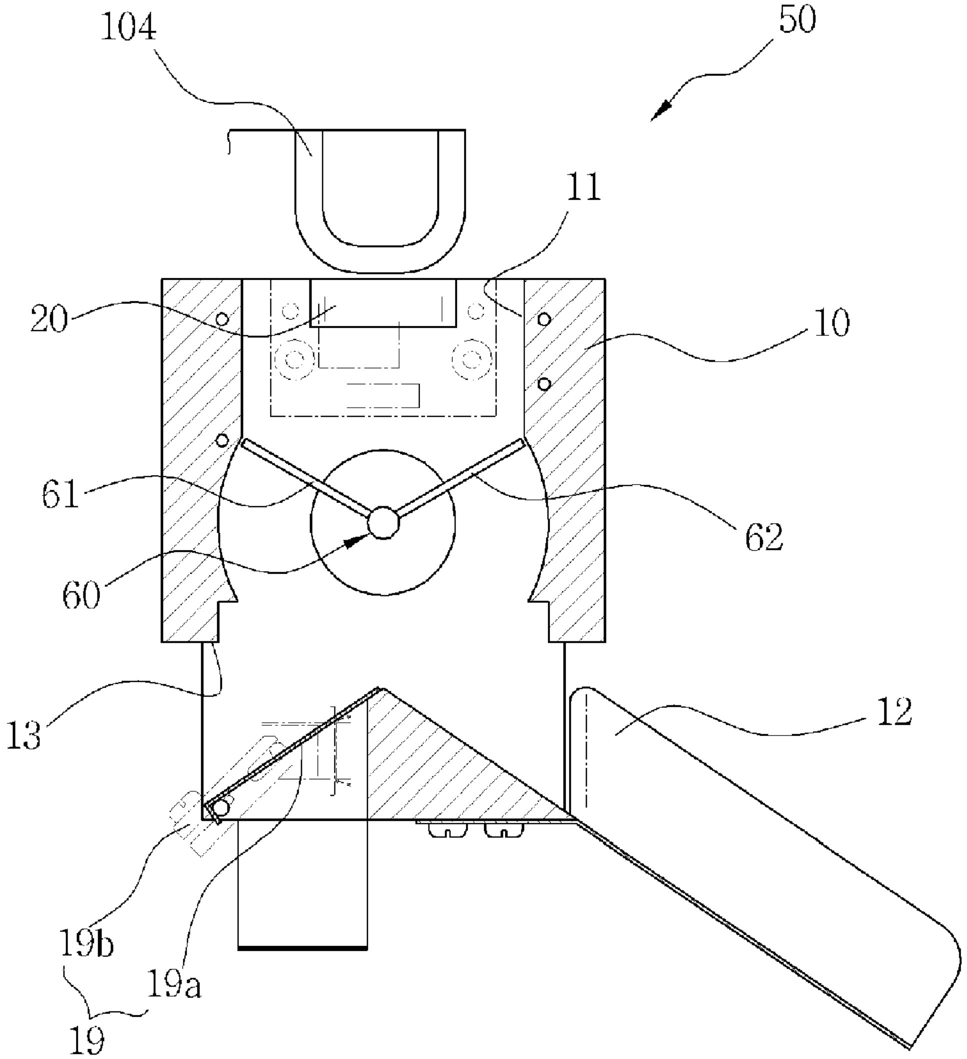
FIG. 11 is a cross-sectional view of the quantity regulating module illustrated in FIG. 7.

Meanwhile, as illustrated in FIG. 11, the rotating member 60 may be comprised of two wings 61 and 62. A tablet staying between the two wings 61 and 62 is rotated in the clockwise direction or in the counterclockwise direction, to thus selectively discharge the tablet to the hopper-side supply part 12 or to the recollecting part 13.

Figure 12:
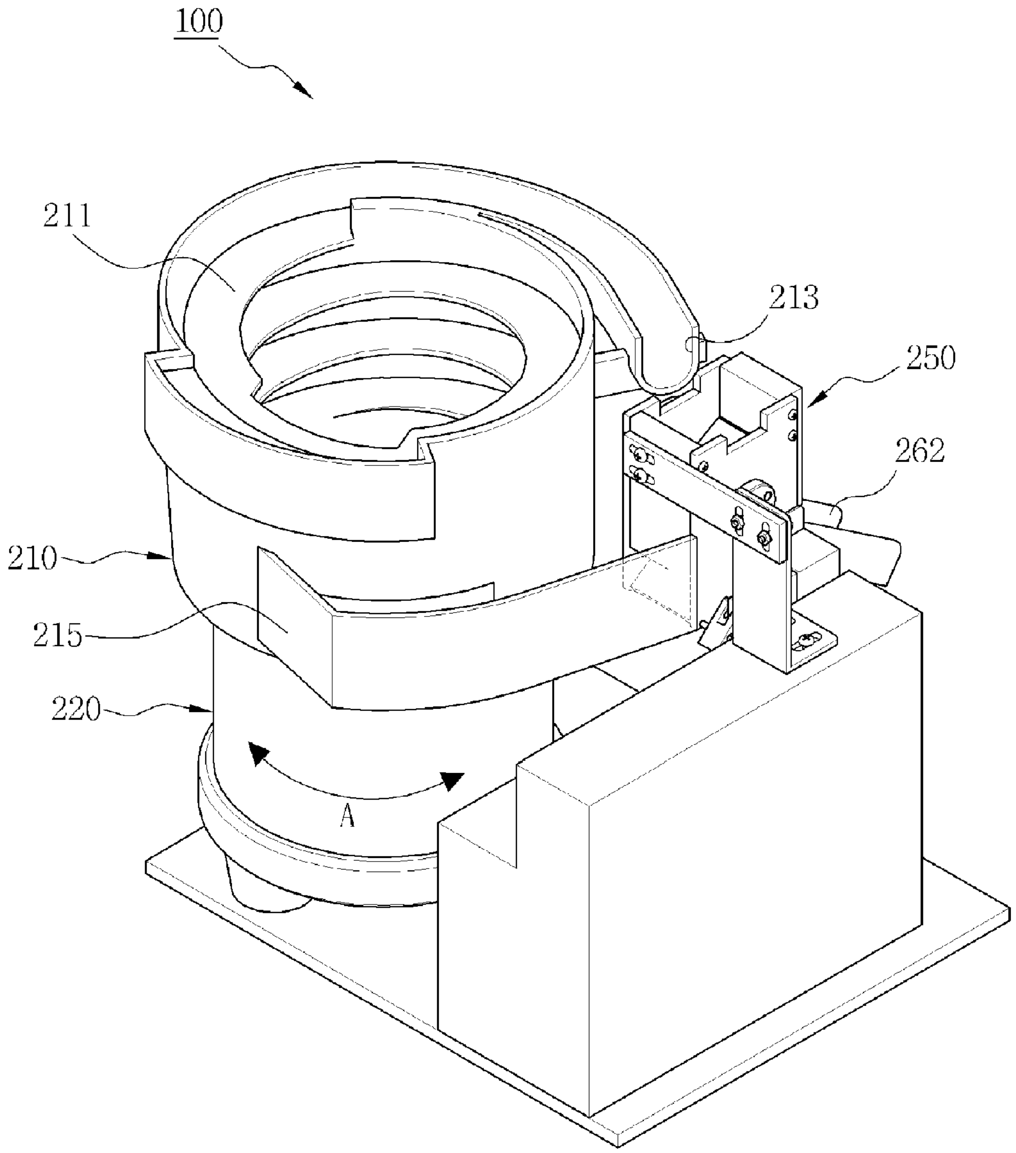
FIG. 12 is a perspective view of an automatic tablet dispenser according to an embodiment.
Figure 13:
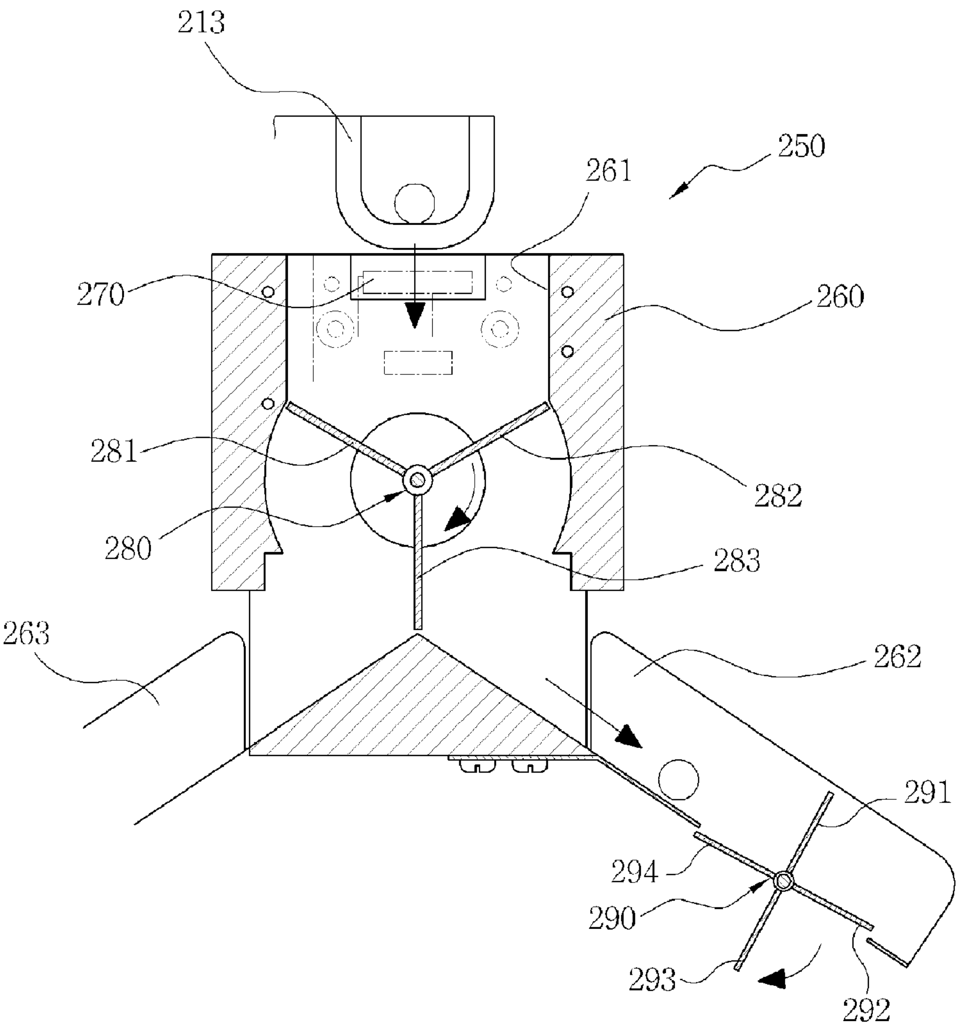
FIG. 13 is a cross-sectional view of a quantity regulating module of the automatic tablet dispenser illustrated in FIG. 10, according to still yet another embodiment.

FIG. 12 is a perspective view of an automatic tablet dispenser 100 according to an embodiment, and FIG. 13 is a cross-sectional view of a quantity regulating module 250 of the automatic tablet dispenser 100 illustrated in FIG. 10, according to still yet another embodiment.

As illustrated in FIGS. 12 and 13, the quantity regulating module 250 includes a supply unit, a transfer passage 262, a first door 280, a second door 290, and a controller.

The supply unit is used to supply tablets to the hopper 120 of the medicine packing machine 200 (see FIG. 1). The supply unit may be a plurality of cassettes installed in the automatic medicine pacing machine 200 described above, or may be a distributing tray of a manual medicine packing machine. In this specification, the supply unit is a type which can receive and transfer various-shaped tablets, such as half tablets, quarter tablets, etc. Here, the various-shaped tablets include half tablets, quarter tablets, ellipse tablets, square tablets and so on.

That is, the supply unit can be comprised of a body 210 and a vibrating unit 220.

The body 210 is in a cylindrical shape whose upper part is opened and whose lower part is closed. The body 210 includes a guide track 211 therein. The guide track 211 has a spiral shape extending from the bottom to the upper part of the body 210. The guide track 211 is a passage through which tablets contained in the body 210 are transferred.

The vibrating unit 220 causes tablets contained in the body 210 to be transferred along the guide track 211. The vibrating unit 220 is installed below the body 210, and provides a soft vibration to the body 210 in the clockwise direction or in the counter-clockwise direction. Accordingly, tablets contained in the body 210 are transferred upward along the guide track 211.

The transfer passage 262, as illustrated in FIG. 3, is used to transfer tablets supplied from the supply unit to the hopper 120 of the medicine packing machine 200.

The first door 280 is opened when the number of tablets supplied from the supply unit is equal to a predetermined quantity. The first door 280 may be opened to the transfer passage 262. The first door 280 may be constructed by connecting at least one door plate (in the current embodiment, three door plates 281, 281 and 283 positioned in the radial direction) to a motor. The number of the door plates 281, 282 and 293 may be three, two or four. Meanwhile, the first door 280 may be in the shape of a single plate connected to a solenoid.

The second door 290 is disposed between the first door 280 and the hopper 120, and opens or closes the transfer passage 262. The second door 290 may be disposed near the center of the first door 280 and the hopper 120. The second door 290 is opened in response to a signal of a main controller of the medicine packing machine 200. Since the second door 290 is disposed on the transfer passage 262, a time consumed to transfer tablets supplied from the supply unit to the hopper 120 can be reduced.

The main controller performs the entire control related to causing cassettes 110 to discharge tablets so that the tablets are collected in the hopper 120 of the medicine packing machine 200.

If the second door 290 is not provided, tablets supplied from the supply unit are discharged from the first door 280 to the hopper 120. The transfer distance of tablets becomes the length of the transfer passage 262 connecting the supply unit to the hopper 120. A time consumed to transfer tablets is proportional to the length of the transfer passage 262, and reducing the length of the transfer passage is impossible in view of the construction of the medicine packing machine 200.

However, in the medicine packing machine 200, tablets are supplied from a plurality of cassettes 110, as well as from the supply unit, and also a powdered medicine can be supplied separately, and the tablets and powdered medicine are all collected in the hopper 120 and then packed for each dose of medicine. Accordingly, the tablets discharged through the cassettes 110 disposed above the hopper 120 reach the hopper 120 rapidly by free-falling, and the powered medicine can also reach the hopper 120 in a short time because the powered medicine is supplied adjacent to the hopper 120.

That is, in the quantity regulating module 250 according to the current embodiment, the second door 290 is disposed at a proper location of the transfer passage 262 so that tablets supplied from the supply unit do not start from the first door 280 but start from a location adjacent to the hopper 120. According to a test result, the transfer time of tablets when the second door 290 is provided is much shorter than the transfer time of tablets when the second door 290 is not provided.

When the second door 290 is opened to discharge tablets to the hopper 120, the controller causes the supply unit to supply another tablet. Also, simultaneously, the controller maintains the first door 280 closed when a tablet exists between the first door 280 and the second door 290. That is, the first door 280 is opened when it is determined that no tablet exists between the first door 280 and the second door 290. Accordingly, the first door 280 is opened only when the number of tablets discharged from the supply unit is equal to the predetermined quantity and no tablet exists between the first door 280 and the second door 290.

Meanwhile, the quantity regulating module 250 can further include a recollecting passage 263. The recollecting passage 263 is used to return tablets supplied from the supply unit to the supply unit when the number of the tablets exceeds the predetermined quantity. That is, the first door 280 rotates in the counterclockwise direction when the number of tablets supplied from the supply unit exceeds the predetermined quantity, and discharges the tablets to the recollecting passage 263. The recollected tablets are returned to the body 210 via a recollecting barrel 215.

Also, the second door 290 may be implemented in such a manner that a plurality of door plates 291, 292, 293 and 294 for opening or closing the transfer passage 262 are positioned in the radial direction. The motor may be a step motor which is rotated by 90 upon each operation. The door plates 291, 292, 293 and 294 form a tolerance of an acute angle downward toward the bottom of the transfer passage 262, thereby preventing tablets from being caught by the door plates 291, 292, 293 and 294.

Also, concave curved parts 299 are formed at intersections of the door plates 291, 292, 293 and 294, in order to prevent tablets from being caught by the door plates 291, 292, 293 and 294. Specifically, the concave curved parts 299 can prevent small-sized tablets or tablets having sharp ends from being caught at the intersections of the door plates 291, 292, 293 and 294.

Figure 14:
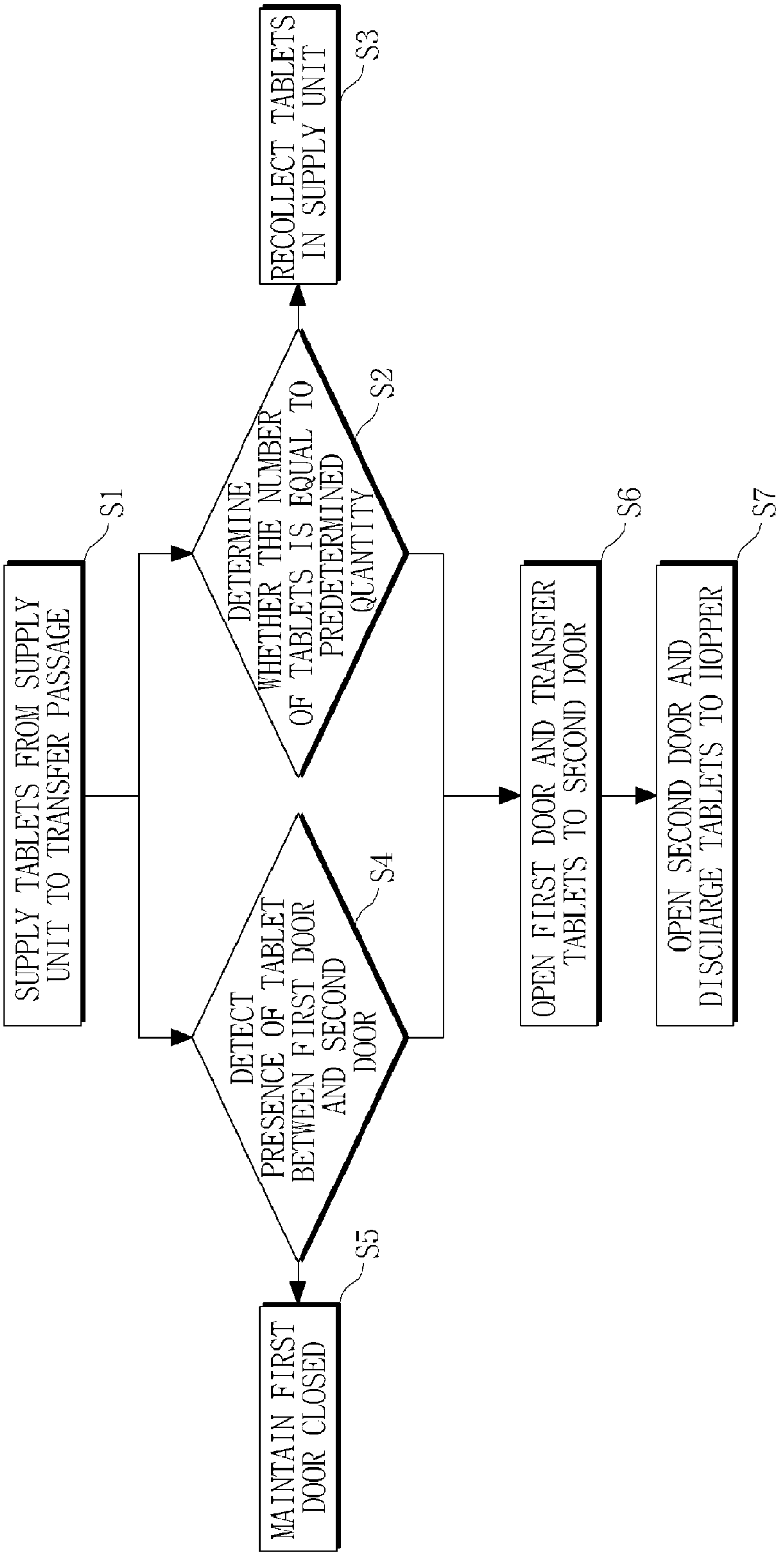
FIG. 14 is a flowchart of a tablet dispensing method according to an embodiment.

FIG. 14 is a flowchart of a tablet dispensing method according to an embodiment.

As shown in FIG. 14, the tablet dispensing method according to the current embodiment includes: supplying tablets from a supply unit to a transfer passage (operation S1); determining whether the number of the tablets is equal to a predetermined quantity (operation S2); determining whether a tablet exists between a first door and a second door (operation S4); maintaining the first door closed if a tablet exists between the first door and the second door, and opening the first door and transferring the tablet to the second door if no tablet exists between the first door and the second door (operation S5 and S6); and opening the second door and discharging the tablet to a hopper (operation S7).

In operation S1, tablets are supplied from the supply unit. The supply unit can be implemented in such a manner as to vibrate a body containing tablets therein using a vibrating unit. The tablets contained in the body 210 are transferred upward along a guide track formed on the inner wall of the body by vibration of the vibrating unit, and then discharged through an outlet.

In operation S2, it is determined whether the number of tablets discharged from the supply unit is equal to a predetermined quantity. In operation S2, the determination can be performed by a sensor for counting the number of tablets. For example, as described above, when it is assumed that tablets are transferred by vibration of the vibrating unit and the predetermined quantity is one tablet, if a single tablet falls down from the outlet of the guide track, the above condition is satisfied. However, if another tablet unwantedly falls down after a single tablet falls down through the outlet 213, the above condition is not satisfied.

In operation S4, it is determined whether a tablet exists between the first door and the second door. When the second door remains closed after the first door is opened and a tablet is discharged to the second door, it can be determined that a tablet exists between the first door and the second door. Meanwhile, when the first door is not opened after the second door is opened and a tablet is discharged, it can be determined that no tablet exists between the first door and the second door.

In operation S5, the first door is maintained closed if a tablet exists between the first door and the second door.

In operation S6, the first door is opened and the tablet is transferred to the second door if no tablet exists between the first door and the second door.

In operation S7, the second door is opened in response to a signal of a controller and the tablet is discharged to the hopper. The operation S7 may be controlled by a main controller of a medicine packing machine.

Meanwhile, after the first door is opened and a tablet is discharged toward the second door, operation of supplying another tablet from the supply unit to the second door may be performed.

Accordingly, when the second door is opened and the tablet is discharged to the hopper, simultaneously, other tablets are transferred from the first door to the second door and from the supply unit to the first door. Also, the tablet dispensing method can further include operation S3 of recollecting tablets in the supply unit when the number of the tablets exceeds a predetermined quantity.

In operation S3, the tablets can be returned to the supply unit through a recollecting passage by rotating the first door in the counterclockwise direction.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

INDUSTRIAL APPLICABILITY

The automatic tablet dispenser according to the present invention can be applied to various automatic packing machines.

The invention claimed is:

1. A quantity regulating module of an automatic tablet dispenser, comprising:

a module body including an inlet through which a tablet is put, a hopper-side supply part supplying the tablet put through the inlet to a hopper of a medicine packing machine, and a recollecting part returning the tablet put through the inlet to a location from which the tablet starts to be transferred;

a detecting sensor counting the number of tablets put through the inlet; and a controller comparing the number of tablets counted by the detecting sensor to a predetermined quantity, transferring the tablets to the hopper-side supply part when the counted number of tablets is equal to the predetermined quantity, and transferring the tablets to the recollecting part when the counted number of tablets exceeds the predetermined quantity, wherein the module body further comprises a discharge unit, which comprises a door configured to discharge the tablet transferred to the recollecting part to the outside and a solenoid configured to drive the door.

2. The quantity regulating module of claim 1, wherein the detecting sensor comprises at least one light-emitting part for emitting light, and at least one light-receiving part for receiving the light emitted from the at least one light-emitting part and determining whether a tablet passes therethrough.

3. The quantity regulating module of claim 1, wherein the at least one light-emitting part is positioned in correspondence to the at least one light-receiving part.

4. The quantity regulating module of claim 1, wherein the module body further comprises a stopper configured to drop a tablet rapidly into the inlet or, when the detecting sensor senses the tablet, the stopper is configured to prevent another tablet from being successively dropped after the tablet.

5. The quantity regulating module of claim 1, wherein the module body comprises:

a rotating member disposed below the inlet, including a plurality of wings positioned in a radial direction to receive the tablet falling down from the inlet between the plurality of wings, and discharging the tablet selectively to the hopper-side supply part or to the recollecting part according to a rotating direction of the rotating member; and a motor rotating the rotating member forward or backward to selectively open the hopper-side supply part or the recollecting part under the control of the controller.

6. The quantity regulating module of claim 5, wherein the plurality of wings are positioned at angles of 120°.

7. A quantity regulating module of an automatic tablet dispenser, comprising:

a supply unit supplying a tablet to a hopper of a medicine packing machine;

a transfer passage guiding the tablet supplied from the supply unit to be transferred to the hopper;

a first door being opened when the number of tablets supplied from the supply unit is equal to a predetermined quantity;

a second door opening or closing the transfer passage between the first door and the hopper;

a discharge unit comprising a third door configured to discharge the tablet transferred to the second door to the outside and a solenoid configured to drive the third door; and a controller causing the supply unit to supply another tablet when the second door is opened, and maintaining the first door closed when a tablet exists between the first door and the second door.

8. The quantity regulating module of claim 7, further comprising a recollecting passage returning tablets supplied from the supply unit to the supply unit when the number of the tablets exceeds the predetermined quantity.

9. The quantity regulating module of claim 7, wherein the second door includes a plurality of door plates opening or closing the transfer passage and positioned in a radial direction, and is rotated by a motor.

10. The quantity regulating module of claim 7, wherein a plurality of concave curved parts are formed respectively at intersections of the plurality of door plates, to prevent a tablet from being caught by the plurality of door plates.

11. A tablet dispensing method of an automatic tablet dispenser, comprising:

supplying a tablet from a supply unit to a transfer passage;

determining whether the number of tablets supplied from the supply unit is equal to a predetermined quantity;

determining whether a tablet exists between a first door and a second door positioned on the transfer passage;

closing the first door to keep a tablet transferred to the transfer passage from the supply unit when a tablet exists between the first door and the second door, and opening the first door and transferring to the second door the tablet transferred to the transfer passage from the supply unit when no tablet exists between the first door and the second door;

opening the second door in response to a signal of the controller and discharging the tablet to the hopper; and discharging the tablet transferred to the second door to the outside through a third door, wherein the third door is driven using a solenoid.

12. The tablet dispensing method of claim 11, further comprising supplying another tablet from the supply unit to the first door, after the first door is opened and the tablet is discharged to the second door.

13. The tablet dispensing method of claim 11, further comprising recollecting tablets when the number of the tablets exceeds the predetermined quantity.

* * * * *